June 23, 1964  H. H. AVERY  3,138,015
AUTOMATIC FLUID TESTING MECHANISM
Filed Dec. 29, 1960  4 Sheets-Sheet 1
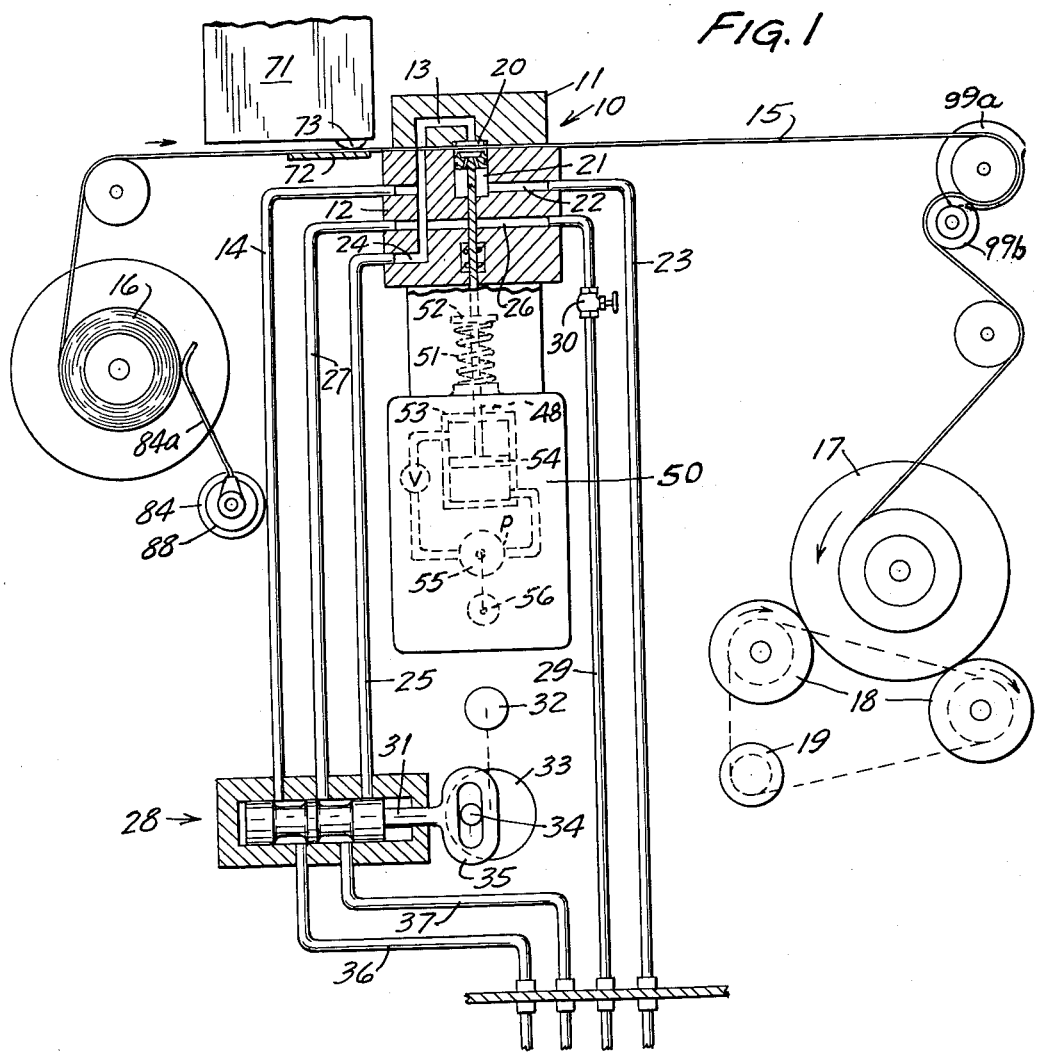
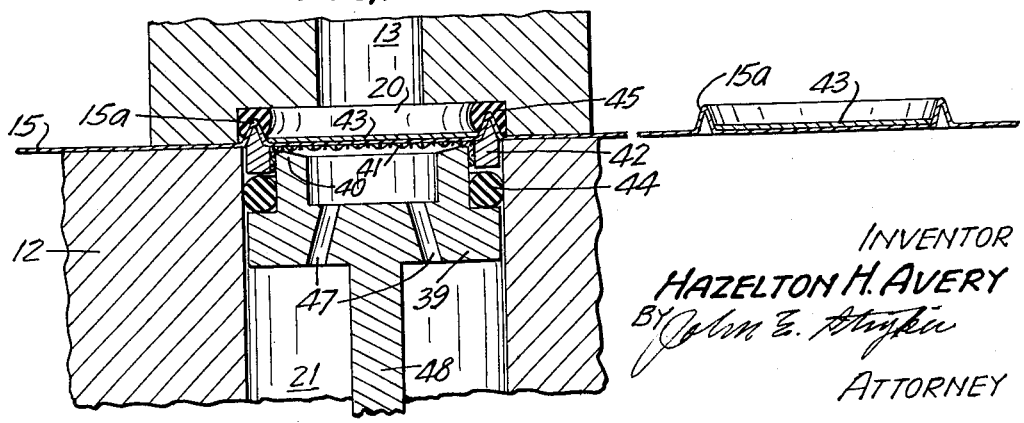
INVENTOR
HAZELTON H. AVERY
BY John E. Stryker
ATTORNEY June 23, 1964 H. H. AVERY 3,138,015
AUTOMATIC FLUID TESTING MECHANISM
Filed Dec. 29, 1960 4 Sheets-Sheet 2

INVENTOR
HAZELTON H. AVERY
BY John E. Stryker
ATTORNEY

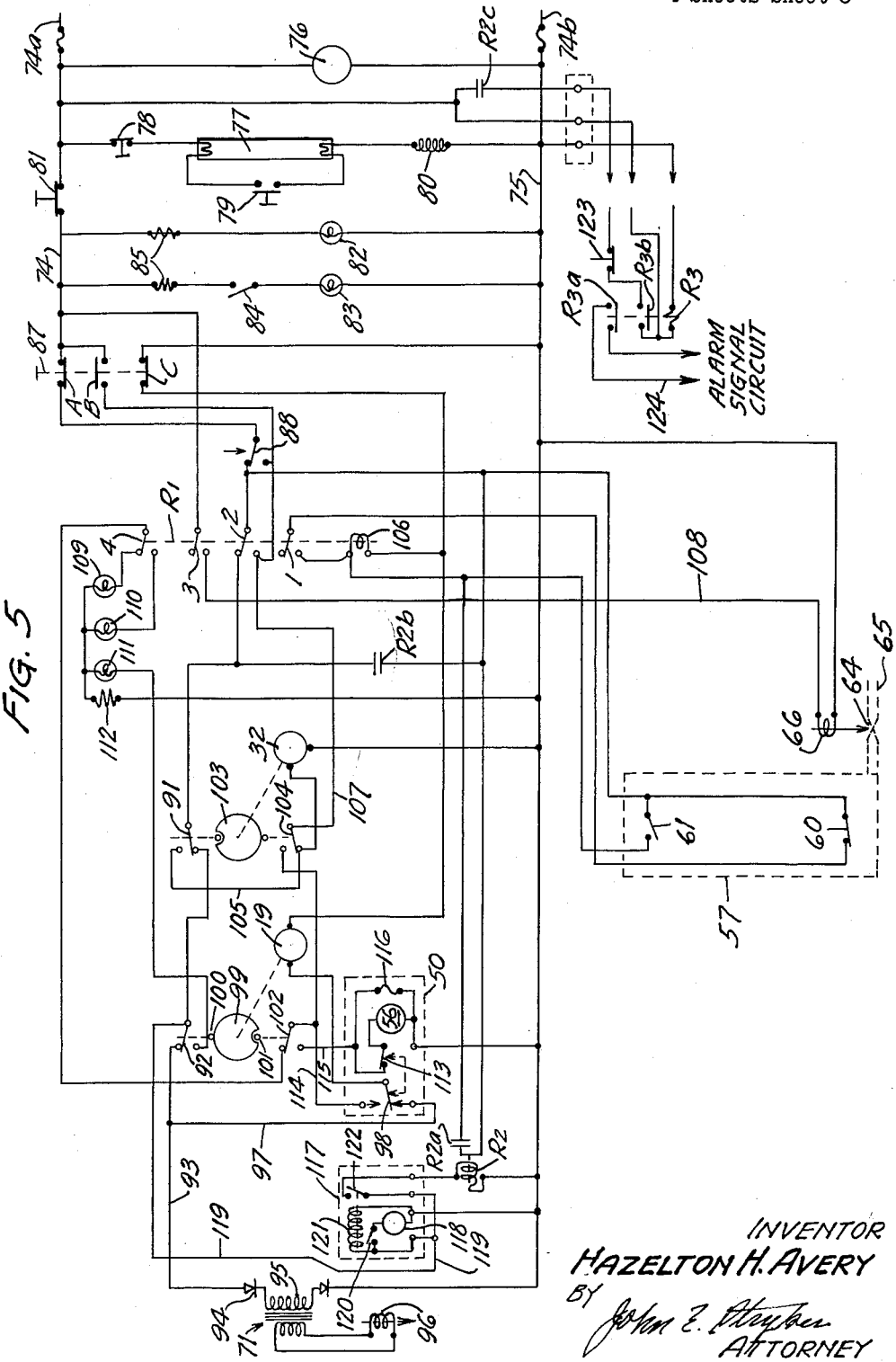

June 23, 1964 H. H. AVERY 3,138,015
AUTOMATIC FLUID TESTING MECHANISM
Filed Dec. 29, 1960 4 Sheets-Sheet 4
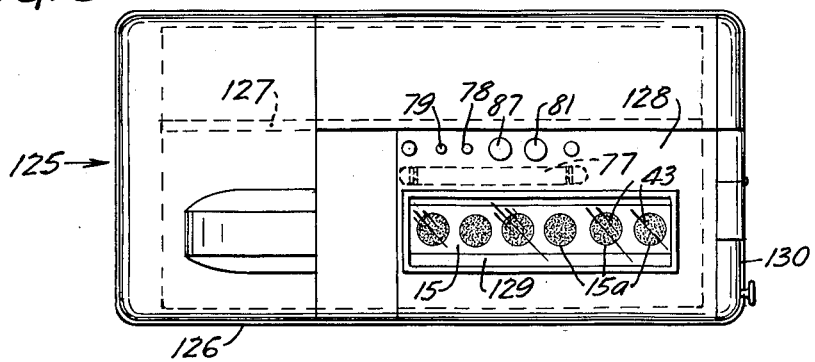
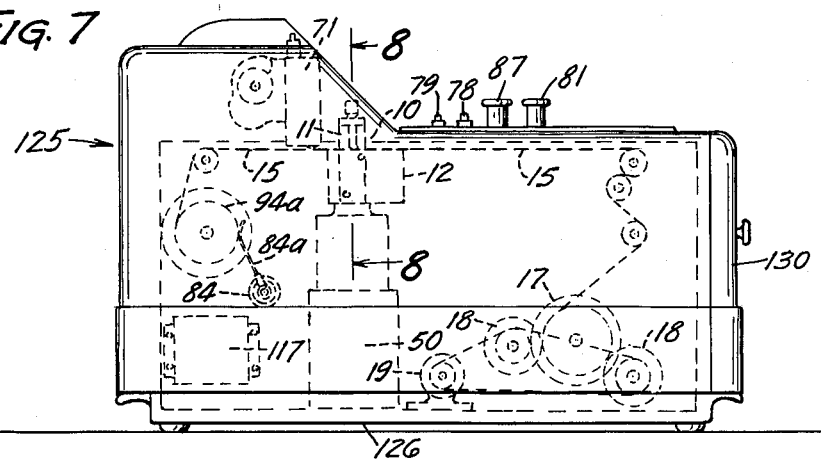
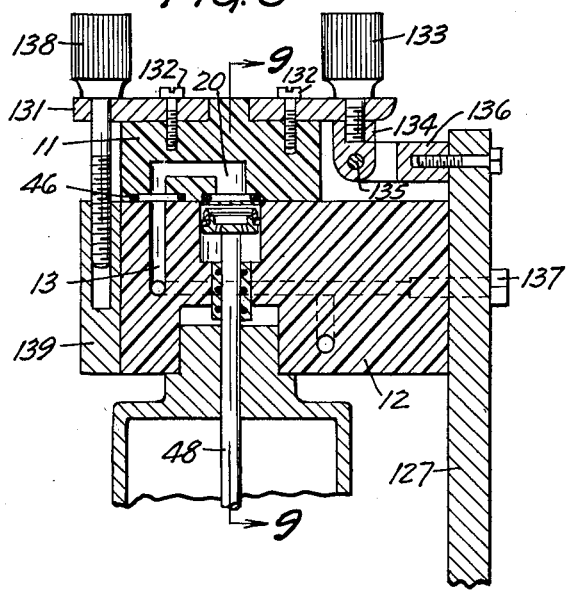
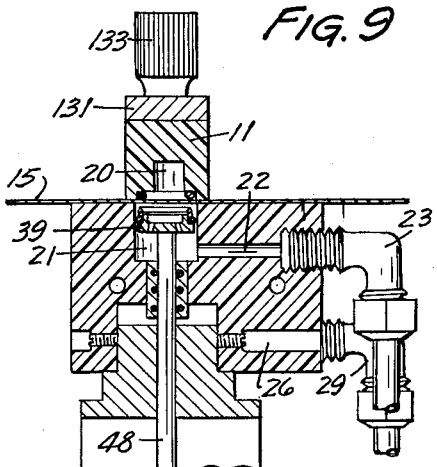
INVENTOR
HAZELTON H. AVERY
BY John E. Stryker
ATTORNEY

United States Patent Office 3,138,015
Patented June 23, 1964

3,138,015
AUTOMATIC FLUID TESTING MECHANISM
Hazelton H. Avery, Brooklyn, N.Y., assignor to Union Tank Car Company, Chicago, Ill., a corporation of New Jersey
Filed Dec. 29, 1960, Ser. No. 79,216
23 Claims. (Cl. 73—61)

This invention relates to mechanism for periodically depositing on a porous tape samples of solid particles which are filtered from measured quantities of fluids to be analyzed.

My invention is particularly, although not exclusively, adapted for use in analyzing the solid content of feed water for high pressure central station and industrial steam power plants. Some of the most serious problems encountered in the operation and maintenance of such plants are caused by corrosion products which are picked up in the system and deposited at various critical points in the boiler and turbine. A major source of corrosion products is the condensate cycle where, because of the large flows involved, small concentrations of solids in the range of 10 to 50 parts per billion, if deposited in the boiler or turbine, can account for hundreds of pounds of deposits per year. As boiler pressures become higher the tolerable level of corrosion products in the condensate becomes lower. For super-critical pressure, once-through installations an average concentration below 10 parts per billion is generally desired, and the reasonable maximum concentration is about 20 parts per billion.

In recent years, a need has developed for more precise and practical test methods that are accurate in these very low ranges of concentrations. Not only is there a need for more accurate and simpler testing means for determining copper, iron, silica and other trace impurities concentrations, but a need has also arisen for automatic analyzing instruments which can accurately and reliably monitor the quality of the condensate twenty-four hours a day. Mechanism of this kind is of particular importance where corrosion products or "crud" are concerned because it is known that these impurities come and go like clouds in the system. There may be long periods of very low concentrations followed by short periods of rather high concentrations, the peaks being sometimes ten to twenty times higher in concentration than the average. This condition occurs particularly during the start-up of a new unit and also during periods of load swings.

The present invention meets the need for an instrument which will automatically and accurately sample and test fluids for variable concentrations of solid particles contained in the samples.

According to the present invention, samples of the fluid to be tested are passed through a sub-micron porosity filter material periodically and automatically. A suitable filter material is "Millipore" tape marketed by Millipore Filter Corporation of Bedford, Mass. This material consists of cellulosic membrane having on the order of 50 million capillary pores of substantially uniform size per square centimeter. It is available in various grades of porosity ranging from ten millimicrons to three microns. Although the pressure loss through this film material during filtration is high, I have found that by using a proper support at the downstream side of the film the filtration can be carried out at pressure differentials within the range 30 p.s.i. to 100 p.s.i. When samples of condensate are filtered in sufficient quantity through circular areas of this "Millipore" material of fine porosity, a stain visible to the naked eye is formed even when such low concentrations as 2 or 4 parts per billion of "crud" are present in the condensate. By analyzing the iron and copper concentrations in condensate samples and filtering the same samples through "Millipore" material, it is feasible to calibrate the stains so that a fairly accurate estimate of the concentration can be made visually.

It is an object of this invention to provide automatic mechanism for making a lasting record on a fine porosity filter tape of the quantities of solid particles present in fluids of various kinds, the mechanism being power actuated to operate for long periods of time unattended.

A further object is to provide automatic fluid testing mechanism of the character described including mechanism for imprinting on the tape an indication of the time of day when each sample of residue is filtered from a known volume of fluid.

Other objects will appear and be more fully pointed out in the following specification and claims.

According to my invention, porous filter tape of the required porosity is drawn through a filter head from a supply spool by means of power actuated tape advancing mechanism. The used tape is stored on a take-up reel for future reference or for disposal. A time printer is energized periodically to stamp time indicia directly on the tape adjacent to each of the several filtered residue deposits. Test samples may be taken at predetermined, clock controlled times. However, for many installations it is preferable to terminate each filtering cycle when a predetermined volume of effluent has passed through the tape and to initiate the next cycle after a time interval which may be determined by metering the filtrate collected during the preceding filtering cycle. If it is preferred to start the successive cycles at predetermined times, rather than to base each cycle on a measured volume of filtrate, a clock operated timer may be provided to energize the time printing means, filter sealing means, power operated valve means, and tape advancing means at predetermined time intervals.

My electrical and valving components execute the successive filtering cycles smoothly and at selected intervals. To provide filter samples of equal volume, a tank equipped with high and low level float actuated electric switches is connected by tubular elements to the filter, and by electric circuit connections with means for activating filter sealing mechanism, flow control valve means and tape advancing means.

Essential elements of the present invention are a filter having a head and body between which the porous tape is positioned, a passage formed in the filter head and body for conducting fluid under pressure to and through the porous tape and for disposing of the filtrate. Other essential elements are valve means for intermittently admitting fluid under pressure to the filter, means for advancing the tape step by step to successive filter positions, and means for closing and sealing the filter during each filtering operation after the tape has been advanced to successive filter positions.

Referring to the accompanying drawings which illustrate, by way of example and not for the purpose of limitation, a preferred embodiment of my invention:

FIGURE 1 is a schematic part side elevational and part vertical sectional view showing the filter head and body, fluid conduits and passages connected therewith, valve, tape supply and guiding elements, time printer, and filter seal actuating mechanism;

FIG. 4 is a vertical sectional view on a larger scale showing details of the filter closing and sealing mechanism;

FIG. 5 is a schematic wiring diagram for a preferred embodiment of the invention;

FIG. 6 is a plan view showing a suitable housing containing the components shown in FIG. 1;

FIG. 7 is a front elevational view of the housing;

FIG. 8 is a vertical cross sectional view taken on the line 8—8 of FIG. 7, showing details of the filter head clamping means, and FIG. 9 is a vertical sectional view taken on the line 9—9 of FIG. 8.

Figure 2:
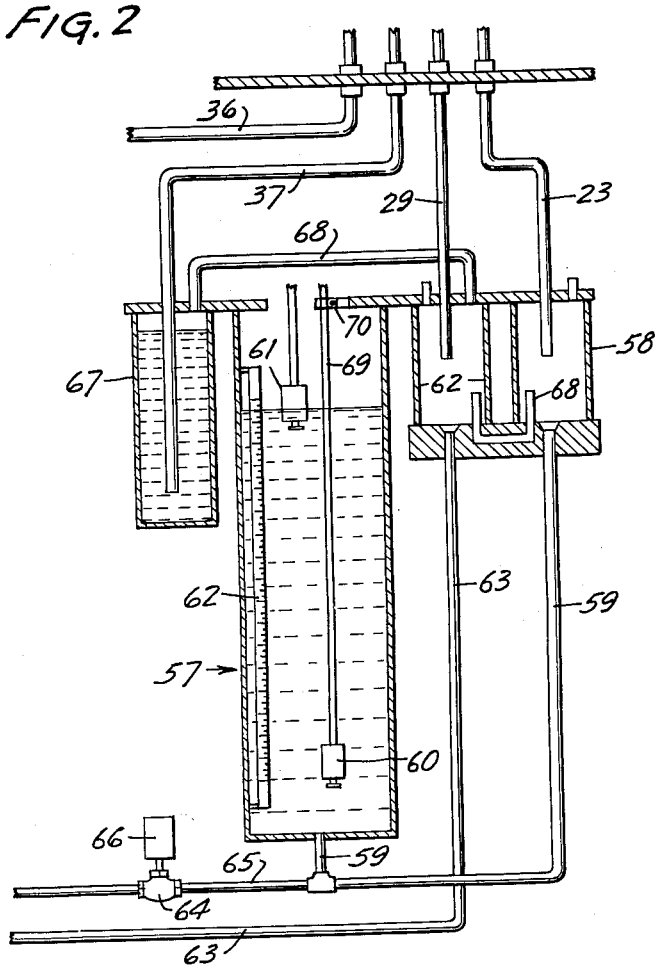
FIG. 2 is a semi-schematic, part side elevational and part vertical sectional view through the volume control tank and associated components.

Referring to FIG. 1, a filter indicated generally by the numeral 10 has a head 11 and a body 12 formed with passages for the flow of fluid from one to the other and to and from the filter. An inlet passage 13 is connected to an inlet conduit 14 adapted to supply the fluid to be tested under pressure. Porous filter tape 15 is guided along a path which extends between the head 11 and body 12 in a shallow groove and the head 11 is removable, being normally held in place on the body 12 by fastening means hereinafter described. The tape 15 is supplied from a reel 16 and is guided along its path of movement by a series of guide rolls suitably arranged as indicated in FIG. 1. The used or stained tape is stored on a reel 17 which is tured intermittently by a pair of friction driving rolls 18 operatively connected to an electric motor 19.

A small reservoir 20 is formed in the head 11 at the upper side of the tape 15 and this reservoir is in open communication with the upper end of a cylindrical chamber 21 formed in the filter body 12. From the chamber 21 an outlet passage for filtrate, indicated at 22, connects with an outlet conduit 23, the outlet terminal portion of which is shown in FIG. 2. A branch 24 of the passage 13 is connected to a vent conduit 25. The passage 13 is shown in detail in FIGS. 8 and 9, being in a plane which is at 90° from the plane of the section shown in FIG. 1. Also formed in the filter body 12, but not connected to the other passages therein is a by-pass passage 26, one end of which is connected by a conduit 27 to one of the five ports of a flow control valve indicated generally at 28. The other end of the passage 26 is connected to a conduit 29 extending to a vented by-pass outlet, as hereinafter more fully described with reference to FIG. 2 of the drawings. Interposed in the conduit 29 is a by-pass flow rate control valve 30.

Flow of fluid under pressure to the filter and through the by-pass conduits and vent passages and conduits is under control of the valve 28. This is a five-port, two position spool type of valve, having a plunger 31 which is operatively connected to an electric motor 32 by linkage which imparts a slow start and stop transition from one position of the plunger to the other. The linkage includes a motor driven rotary member 33 carrying an eccentric crank pin 34 arranged to transmit reciprocating motion to a yoke member 35. The yoke member is rigidly connected to the plunger 31 and the crank pin 34 slidably engages member 35 in a cam slot which is elongated at right angles to the plunger movement. The motor 32 is energized under controls which deenergize and stop the motor alternately with the crank pin 34 in dead center positions at opposite sides of the axis of rotation of the member 33. Thus slow motion is imparted to the valve member 31 as it starts from one position to the other, thereby preventing rapid pressure surges in the filter inlet line which would otherwise cause vibration in sample lines and loosening of residue deposits in them. Suitable sealing means are provided on the valve plunger 31 or in the cylindrical valve chamber to effectively seal the passage along the bore between ports. O ring sealing members of conventional type may be used for this purpose.

The valve body has ports connected respectively to the conduits 14, 27 and 25, an inlet port at the terminal of a sample supply conduit 36, and a vent port communicating with vent conduit 37. FIG. 2 shows extensions of the several conduits 23, 29, 36 and 37 associated with the volume control tank.

Figure 3:
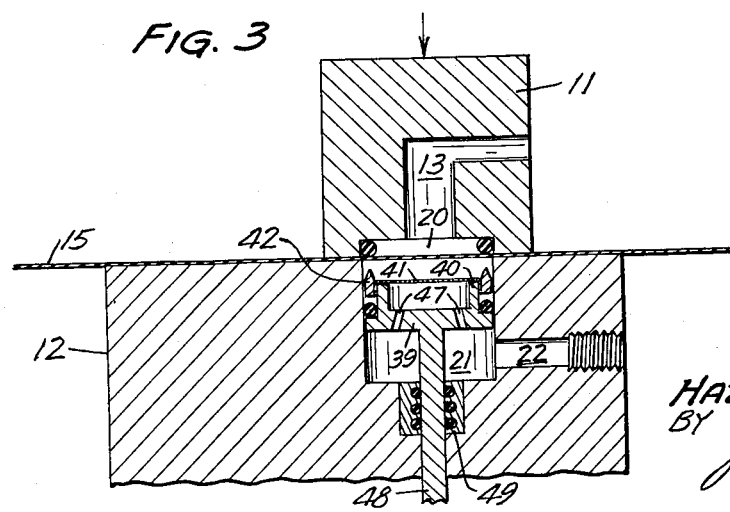
FIG. 3 is a vertical sectional view through fragmentary portions of the filter body and head, showing particularly the filter closing and sealing members in retracted position.

Details of the filter closing and tape contacting members of the filter are shown in FIGS. 3 and 4. FIG. 3 shows these members in retracted position, and FIG. 4 in filter sealing position. A piston head 39 is movable to and from the tape 15 in the filter body chamber 21 and is formed with a perimetric member 40 upon which is mounted a fine mesh screen 41 for supporting the lower side of the tape. It will be evident that the piston head 39, perimetric member 40 and screen 41 form a flow chamber or receptacle at the downstream side of the tape 15. A ring 42 having an annular projection of V shape in cross section for contact with the tape 15 surrounds the outer periphery of the member 40 and projects above the screen 41 so that when the filter is closed the projecting edge of the ring forms on the tape (FIG. 4) an annular rim 15a surrounding the area upon which the filtered residue is to be deposited. The filtered residue or stain, indicated at 43 in FIG. 4, is thus confined within the annular rim 15a which effectively guards the residue deposit from smearing, and also minimizes the spreading of deposits to surrounding areas of the tape by capillary action. A resilient compressible O ring 44 is confined between the ring 42 and a shoulder on the piston head 39 to afford a yielding support and seal for the ring and piston head in chamber 21. Another resilient and compressible gasket member 45 is confined in the chamber 20 of the filter head to contact and receive the rim portion 15a of the tape and to seal off the flow passage between the head and filter body. As shown in FIG. 8, another O ring seal member 46 is provided at the junction portions of the passage 13 in the head 11.

Passages 47 are formed in the filter closure member 39 to conduct the filtrate from the lower side of the filter tape to the chamber 21 communicating with the outlet passage 22. A stem 48 is rigidly connected to the member 39 and is connected to hydro-electric operating means for moving this closure member to and from filter sealing position. A suitable bearing and seal 49 for the stem 48 is provided in the lower portion of the filter head 12. Hydro-electric means for actuating the stem 48 are shown schematically in FIG. 1, being indicated generally by the numeral 50. The stem 48 of the member 39 is biased toward filter sealing position by a coiled compression spring 51 which is confined between a collar 52 fixed on the stem and the upper surface of an hydraulic cylinder 53. At its lower end the stem 48 is connected to a piston 54 in the cylinder 53 and the latter has ports communicating with chambers at opposite sides of the piston 54. The ports are connected to flow conduits providing a circuit for hydraulic fluid including a pump 55 operatively connected to an electric motor 56. When the motor 56 is energized, hydraulic fluid is forced from the lower to the upper end chamber in the cylinder 53. A brake of conventional construction is provided for the motor 56 so that when it is deenergized it stops quickly. Interposed in the flow passage leading to the upper chamber is a normally closed valve V which is solenoid actuated to open position when the motor 56 is energized. Hydraulic fluid under pressure is thus retained in the upper chamber during intervals of time when the filter closure member 39 is in retracted position in relation to the filter tape. When the member 39 is extended to seal the filter, fluid under pressure at the lower side of the piston 54 prevents retracting of the member 39 under the pressure exerted by the sample flowing through the filter tape. Fluid under pressure in the upper chamber is merely released to allow the spring 51 to expand when the filter is to be closed and sealed for a filter cycle. An example of suitable hydro-electric operating mechanism of the character described is the valve operator manufactured by General Controls, Model H 1–90VA. Suitable circuits and electrical means for energizing and deenergizing the motor 56 in a predetermined sequence with the energization of the other elements of the invention are hereinafter described with reference to FIG. 5.

As further shown in FIG. 1, time stamp printing mechanism, indicated generally at 71, is mounted at one side of the path of travel of the tape 15 and adjacent to the filter head 11 to coact with an anvil plate 72 supporting the bottom side of the tape to stamp a time indication when each sample of fluid is passed through the filter and tape. This time printer is of a conventional type having a continuously operating clock and a solenoid actuated time stamp member 73, adapted to be energized in timed relation to the movement of the tape 15, by electrical energizing means shown schematically in FIG. 5. A suitable time stamp printer is that manufactured by Royson Engineering Co., and designated as Model R1–2 Identichart.

*Volume Control and Filter Vent Components*

These components are shown schematically in FIG. 2 wherein a volume control tank, indicated generally by the numeral 57, is shown with suitable flow controls and connecting conduits. For gravity flow from the filter 10 to the tank 57, the latter may be placed on a floor or at or below floor level and the filter and associated elements may be supported at a higher elevation, e.g., on an adjacent table. The elements shown schematically in FIG. 1 are, preferably, contained in a compact cabinet, such as that shown in FIGS. 6 and 7. Filtered samples are discharged from the conduit 23 into a vented seal pot 58 and flow from the bottom of this pot through a conduit 59 into the bottom of the tank 57. Mounted within the tank 57 are electric controls for initiating and terminating each filter cycle comprising an adjustable, low level float-actuated switch 60 and a fixed, high level float-actuated switch 61. The walls of the tank 57 are preferably formed from a transparent plastic resin and a graduated scale 62 is mounted in the tank 57 to facilitate measurements of the volume of filtrate which is to be collected during each filter cycle as the result of the adjustment of the elevation of the low level switch 60.

Other accessory components for the volume control tank shown in FIG. 2 include a seal pot 62 into which the discharge end of the by-pass conduit 29 extends and from which the by-pass liquid is discharged through a conduit 63 for returning the unfiltered liquid to the fluid supply system. Flow of the filtered sample to a pump, when required, for return to the system is under control of a solenoid actuated valve 64 interposed in an outlet conduit 65 branching from the inlet conduit 59. The coil of a solenoid 66 for actuating the valve 64 is included in the circuits shown in FIG. 5.

Vent conduit 37 has its outlet end submerged in liquid in a flood tank 56, the top of which is connected by a conduit 68 to the top of the seal pot 62. Communication between the lower portions of the seal pots 58 and 62 is provided through a U-shaped tube 68. Flow from the by-pass conduit 29, being restricted by the valve 30, enters the seal pot 62 at a rate which permits flow by gravity from this pot through the discharge conduit 63.

Means for manually adjusting the elevation of the low level float switch 60 may be provided, for example, by mounting this switch and float assembly on the lower end portion of a vertical supporting rod 69 which is slidable in a clamp bracket 70 having screw means for gripping and retaining the rod 69, with the switch 60 at selected elevations in the tank 57.

*Power Circuits and Controls*

Referring to FIG. 5, electric power lines are indicated at 74 and 75, having terminals at 74a and 75a respectively. The several energizable components are shown in parallel circuits extending between the power lines. The first of these, indicated at the right of FIG. 5, is an electric clock motor 76 for operating the time stamp printer 71, being connected to the indicia printing elements so that the correct time of day is shown on the contact face of the printing head at all times. An elongated fluorescent lamp for illuminating a series of the residue deposits 43 on the tape 15 is indicated at 77 and is included in a circuit which also includes a manually operable "Off" switch 78, a similar "On" switch 79 and a balance coil 80 for the fluorescent lamp. A power "On" or "Off" switch 81 is interposed in the line 74 and an "On" or "Off" power indicator lamp 83 is included in another circuit. A normally closed switch 84 is operatively connected to a feeler arm 84a (FIG. 1) for giving a warning signal when the supply of tape on the supply reel 16 is low. The circuits for the lamps 82 and 83 also include resistors 85. Another circuit includes a relay armature spring 3 of a relay R1 and the coil 66 of the solenoid for drain valve 64.

A manually operable switch 87 has sets of contacts A, B and C and is biased toward the position shown wherein the contacts A and C are closed and contacts B are open. When it is necessary or desirable to interrupt the automatic operation of the mechanism, for any reason, e.g. reloading with a new supply of filter tape, the switch 87 is actuated to open the circuits at contacts A and C and close another circuit at contacts B.

Included in a circuit extending from contacts A, is a normally closed switch 88 which opens when the supply of filter tape has been exhausted, armature spring 2 of relay R1, a double throw, power-actuated switch 91, a second power-actuated, double throw switch 92, and a first branch 93 of this circuit including a rectifier 94 and primary coil 95 of a transformer for energizing the time stamp printer 71. The secondary coil of the transformer is in circuit with the coil of a solenoid 96 for operating the time stamp printer head 73 (FIG. 1). A second branch 97 of the circuit including the switches 91 and 92 also includes an auxiliary switch 98 of the hydro-electric operator 50, the motor 19 for the tape advancing mechanism, and normally closed contacts C of load switch 87.

A cam 99 is operatively connected to the tape motor 19 and is provided with a follower 100 connected to the switch 92 and a follower 101 connected to a switch 102 of the double throw type. A peripheral depression is formed in the cam 99 to alternately receive the followers 100 and 101. When the cam 99 is in the position illustrated, the switches 102 and 92 are closed at their upper contacts and open at their lower contacts. These positions are reversed when cam 99 is turned 190° about its axis of rotation.

A similar "flip-flop" switch arrangement is operatively connected to the valve actuating motor 32. Thus a motor actuated cam 103 is provided with the followers for actuating the switch 91 and a switch 104 from the downwardly closed positions shown to upwardly closed positions when the cam 103 is rotated one-half of a revolution. A conductor 105 connects the lower contact of the switch 104 with the upper contact of switch 91.

The relay R1 has a coil 106 and armature actuated spring contacts 1, 2, 3 and 4. When energized, this relay shifts the power from the upper cam switches 91 and 92 to the lower cam switches 104 and 102 and also energizes signal lamps as hereinafter described. The coil 106 of relay R1 is energized when the upper float control switch 61 is closed, being in series with feeler switch 88, float switch 61 and contacts C of switch 87. In normal operation, relay coil 106 is held in through a holding circuit including low level float switch 60 and armature spring 1. This condition is retained until the tape 15 has advanced to a new position and the flow of fluid by-passing the filter has been completed. Also at the start of the by-pass cycle armature spring 2 closes a circuit including a conductor 107, switch 104 and valve actuating motor 32. At the same time armature spring 3 closes a branch circuit 108 including the solenoid coil 66 of drain valve 64.

Indicator lamps 109, 110 and 111, of different colors, are arranged in circuits for energizing the several lamps to indicate respectively when the mechanism is in the tape loading condition, by-pass cycle and filter cycle.

Parallel lamp circuits include a resistor 112. The circuit for the tape load indicator lamp 109 includes armature spring 4 of relay R1, switches 102, 104, and contacts B of switch 87. By-pass indicator lamp 110 is energized through a circuit which includes armature spring 4 when in its down or second position, switches 102 and 104, armature spring 2, feeler switch 88 and contacts A of switch 87. During the filtering operation, indicator lamp 111 is engaged through a circuit which includes cam switches 92 and 91, when in the down position, armature spring 2, feeler switch 88 and contacts A of switch 87.

Auxiliary switch 98 is a limit switch for the hydraulic piston travel and functions to open circuit 97 and close a circuit 114 at the end of the downward stroke of the piston 54. An internal switch 113 of the hydro-electric operator 50 is in series with the coil of the motor 52 and is operatively connected to the auxiliary switch 98 so that the motor 52 is deenergized and switch 98 closes a branch circuit 114 when the internal switch 113 is actuated to open position. The motor 56 is energized by the closing of internal switch 113 at the end of the filter cycle to retract the filter sealing member 39. Another branch circuit 115 extends from a contact of switch 102 and includes a coil 116 of solenoid for actuating a valve V in flow passages connecting the end chambers in the hydraulic cylinder 53 (FIG. 1).

An adjustable timer, indicated generally by the numeral 117 in FIG. 5, is provided to override the volume control components and interrupt the filter cycle in the event that the filter tape should become clogged to the point of little or no flow through the tape. The timer has an electric motor 118 arranged to be energized through a branch circuit 119 extending from a terminal of switch 92 and including a switch 120 which is closed at the start of the filter cycle. This timer is adjustable to close a control circuit at suitable time intervals in the range of 4 to 60 minutes after the start of each filter cycle. At the end of the override period a solenoid 121 is energized to close a switch 112 for energizing the coil of a relay R2. This relay has normally open spring contacts R2a and R2b which are closed when the relay coil is energized. Upon the closing of these contacts, current is fed from the feeler switch 88 through armature spring 2, contacts R2b and R2a, coil 106 of relay R1 and contact C of switch 87. Relay R1 then switches the circuits to the by-pass cycle condition. By providing contacts R2c, indicated near the lower right of FIG. 5, for the relay R2 an alarm circuit may be energized indicating that the filter cycle has been interrupted by operation of the override timer 117. As shown, the alarm signal circuit may include a relay R3 having normally open spring contacts R3a and R3b arranged to close an alarm circuit 124.

Referring to FIGS. 6 and 7, a suitable housing for the filter and other components illustrated schematically in FIG. 1 is indicated generally at 125. This housing is removably supported on a base 126 and the several functional components in the housing are supported on a vertical frame plate 127 which is rigidly secured to the base. A horizontal control panel 128 extends along the top of the housing and is rigidly secured to the frame plate 127. Control switches 78, 79, 81 and 87 are mounted on this panel and have manually operable buttons projecting from the upper side thereof. The top wall of the housing 125 has an elongated window 129 through which a number of the residue deposits 43 may be observed for comparison, one with the others, the fluorescent lamp 77 being disposed along one side of the window to illuminate the series of spots within their protective rims 15a. At one end the housing 125 has a door 130 to allow access to the take-up reel 17 and associated mechanism.

Details of the filter head attaching means are shown in FIGS. 8 and 9. A clamp bar 131 extends across the top surface of the filter head 11 and is secured thereto by screws 132. At one end, viz., the normally rear end of the bar 131, it is connected by a clamp screw 133 to a hinge member 134 and the latter is connected by hinge pins 135 to a rigid support 136 which is rigidly connected to the frame plate 127. The filter body 12 is also secured by bolts 137 to the frame plate 127.

At its front end, the bar 131 is fitted with a clamp screw 138 for detachably connecting the filter head to a supporting member 139 secured to the front side of the filter body 12. Access to the filter tape where it crosses the filter passage and chamber 20 is obtained by merely loosening the front clamp screw 138 and swinging the filter head back about the hinge pins 135. When the filter head 11 is in its operative position shown in FIG. 8 with the filter sealing member 39 in its retracted position, the tape 15 is freely movable across the chamber 20 in a shallow milled guideway in the filter body.

Summary of Operation

FIG. 5 shows the electrical components in their positions at the moment the time printer solenoid 96 is energized. The time printer head 73 is thereby actuated to print the time of day on the tape, spot removed from the filter spot in the filter head. At this time tape motor 19 is energized driving cam 99 and cam 99a of FIG. 1 which is part of the advancing guide roll. A pressure roller 99b driven by a spring pinches the tape 15 against the driven advancing guide roll; however, during the time print portion of the cycle, the exterior cam profile of cam 99a will disengage the pressure roller 99b from the tape 15. This disengagement occurs for 180° of rotation which is the portion of the cycle when the time printer is in operation. Upon completion of the time print portion of the cycle, the cam 99 as shown in FIG. 5 will be 180° displaced and the cam 99a of the advancing guide roll will be disengaged from its follower of pressure roller 99b as shown in FIG. 1. At the start of a filter cycle the hydro-electric operator motor 56 is deenergized with the filter closure member 39 in the filter sealing position shown in FIG. 4 and the valve 28 is in the filter position shown in FIG. 1. At this time valve motor 32 and tape motor 19 are deenergized. The sample to be tested is supplied under suitable pressure and is fed through conduits 36 and 14 to the filter head chamber 20. The filtrate passes from chamber 21 in the filter body through conduit 23, seal pot 58 and conduit 59, into the bottom of the tank 57. This flow continues until the level of liquid rises in the tank 57 to an elevation which causes the upper level float switch 61 to close.

Thereupon, coil 106 of relay R1 is energized, thereby feeding current to valve motor 32 through armature spring 2 and switch 104. The plunger of valve 28 is now moved to its by-pass position in which the untreated fluid entering through the conduit 36 is discharged through conduit 27, passage 26, conduit 29, and seal pot 62 into the drain or return line 63. The rate of bypass flow is adjusted at the needle valve 30 so that a predetermined desirable period of time is required for the tank 57 to drain to an elevation below the low level float switch 60. Valve 30 may be adjusted so that the rate of flow of by-pass liquid which is returned to the system is approximately equal to the rate of flow through the filter tape. Upon shifting of the valve to by-pass position, the pressure in the filter head is relieved through the vent conduits 27 and 37 and flood tank 67. This guards against the flushing of the sample when the seal on the tape is broken. Also during the by-pass cycle the tape advancing motor 19, connected to the friction drive rolls 18, is energized through a circuit which includes contacts C of switch 87, motor 19, switch 98, conductor 114, switch 104, and armature spring 2. At this time cam 99 is turned from the position shown in FIG. 5, cam 103 has turned 180° from the position shown and hydro-electric operator 50 has closed switch 98 at its upper contact. Immediately after the advance of the tape to the next position, the hydro-electric operator 50 again seals the tape to prevent leakage from the filter head. At this point, the unit remains motionless in the by-pass position until the low level switch 60 opens to deenergize relay R1, terminate the by-pass cycle and start the next filter cycle. The opening of this switch occurs when the filtrate in the tank 57 is drained down to a level below the switch float.

When the supply of tape on the reel 16 is low or exhausted, the reel may be replaced by a new supply after depressing the load button of switch 87. This closes circuits through the contacts B and opens the circuits at the contacts A and C. Response to this switch operation occurs only when the instrument is in the filter cycle. Depressing the load button issues a false high level signal that interrupts the normal sequence of operation when the hydro-electric operator 50 frees the tape. At this time the valve 28 is in its by-pass position and the volume control tank will not drain. The several components will remain in this position until the load button (switch 87) is released. Before this button is released, a fresh reel of tape is placed on the supporting spindle, the filter head 11 is retracted from the filter body 12, as hereinbefore described, the tape is extended over the guide spools and between the time stamp printer 71 and anvil 72, is threaded through groove in the filter, extended to the take-up-reel 17 and secured thereto in suitable manner. With the tape free to be drawn through the recess of the filter, the filter head front clamp screw is drawn down.

In the event that the tape should become completely exhausted from the reel 16, the circuit through the feeler switch 88 will be broken by the sensing arm 84a riding against the tape on the supply reel. This automatically places the apparatus in a semi-load position. Response to this position occurs when the instrument is in the filter position. This semi-load position is similar to the load position, except that the filter head remains sealed. This condition indicating that a new supply of tape is needed may appear as a red light signal (lamp 109). To place the apparatus in the load tape position from an exhausted tape condition, the low level tape sensing arm 84a is moved away from the supply reel 16 and is held out of contact therewith until the apparatus has moved into filter position. Then, by depressing the load button of switch 87, the apparatus will index to the position for loading tape. With the several components in operating condition, they will come to rest in one of three positions. These are the filter position following the time stamp printing operation, the by-pass position and the load position.

Should the filter tape become clogged during the filter operation, the time over-ride timer 117 will energize relay R2 and through the circuits controlled by the contacts of this relay will automatically shift the apparatus to the by-pass cycle and energize an alarm signal as hereinbefore described.

*Fields of Use*

The present invention was developed primarily to provide means for estimating concentrations of corrosive solids in a feed water system, automatically and continuously. It will be evident that the deposits of such solids, or crud, on the tape do not indicate specifically which compounds are present in the deposit, but they do facilitate the making of fairly accurate estimates of the total level of corrosive products in the system and give a clear indication of how the concentration varies throughout the day. With the time printer, my invention provides a permanent record on the tape which may be stored and referred to at any time. The apparatus may be used as a routine monitor at any chosen point in a feed water system, or as a diagnostic tool for use in systems where trouble has developed and where more detailed knowledge of the rate of variation and magnitude of variation of crud level in a system is needed. The addition of a reflectance or transmittance measurement device will make the apparatus a more complete quantitative test instrument.

For nuclear power plants, where the radioactivity level of the crud should be measured, a Geiger counter or other measuring device can readily be added. This use for the apparatus is not limited to radioactivity in crud, but can be applied to the suspended solids in any water supply, and the apparatus can be put in locations remote from the plant, for example, on a river water supply, and visited on a daily or weekly basis for removal of the used tape and replenishing of the supply of tape. The invention is also adaptable to the measurement of fine suspended particles in gases.

I claim:

1. Fluid testing mechanism comprising, a filter having a head and a body and a passage in said head and body for conducting fluid from one to the other thereof; inlet and outlet ports for said passage, a supply of filter tape; means for guiding tape from said supply along a path extending between said head and body and across said passage, fluid inlet and outlet conduits connected to said inlet and outlet ports respectively; power actuated valve means interposed in said inlet conduit to control the flow of fluid to said filter; power actuated tape moving means adapted to intermittently advance the tape along said path step by step; and means for sequentially energizing said tape moving means and valve means to successively conduct a sample of fluid through the filter and tape, interrupt the flow through the filter, and advance the tape to another filtering position.

2. Fluid testing mechanism in accordance with claim 1 including means for energizing said valve means to terminate each filtering operation when a predetermined volume of fluid has been filtered through the tape.

3. Fluid testing mechanism in accordance with claim 1 including, a volume control tank connected to said outlet conduit to receive filtrate from said filter, and means operative when a predetermined high level of fluid is reached in said tank for energizing said valve means to terminate the flow through said filter passage and tape.

4. Fluid testing mechanism in accordance with claim 1 including a volume control tank connected to said outlet conduit to receive filtrate from said filter, and means operative when a predetermined low level of fluid is reached in said tank for energizing said valve means to initiate the flow of fluid through said filter passage and tape.

5. Fluid testing mechanism in accordance with claim 3 including means operative when a predetermined low level of fluid is reached in said tank for energizing said valve means to initiate the flow of fluid through said filter passage and tape.

6. Fluid testing mechanism in accordance with claim 1 including time printing means disposed adjacent to the path of said tape for imprinting time indicia on the tape and means for energizing said time printing means to stamp on the tape an indication of the approximate time of each filtering operation.

7. Fluid testing mechanism in accordance with claim 1 in which said filter tape comprises a plastic fiber-reinforced, porous strip the pores of which are of submicron size.

8. Fluid testing mechanism comprising, a filter having a head and a body and a passage in said head and body for conducting fluid from one to the other thereof; a supply of filter tape; means for guiding tape from said supply along a path extending between said head and body and across said passage; an inlet conduit disposed to supply fluid containing solid particles to an inlet end of said passage; an outlet conduit connected to an outlet end of said passage; filter sealing means movable to close said filter during each filtering operation, power-actuated means for moving said sealing means to and from sealing position; power actuated valve means interposed in said inlet conduit for controlling the flow of fluid to said filter;

power actuated tape moving means adapted to advance the tape along said path step by step; and means for sequentially energizing said sealing means, valve means and tape moving means to successively seal the filter, initiate the flow of fluid through the filter and the tape, terminate the flow through the filter, withdraw the sealing means from sealing position and advance the tape to another filtrate receiving position through a multiplicity of filtering cycles.

9. Fluid testing means in accordance with claim 8 in which said filter sealing means comprises, a movable flow chamber for filtrate at the downstream side of the tape and having a perimetric wall member engageable with the tape to define and seal off a filtered residue area thereof.

10. Fluid testing apparatus in accordance with claim 9 including a foraminous support for the downstream side of the tape carried by said receptacle.

11. Fluid testing apparatus in accordance with claim 9 including coacting perimetric gaskets of resilient compressible material carried by said filter head and wall member respectively for contact with opposite sides of the tape when the filter is closed.

12. Fluid testing mechanism in accordance with claim 8 in which said power actuated means for moving said sealing means to and from sealing position includes an hydraulic motor operatively connected to said means for retracting the sealing means from the tape and operative when the sealing means are in sealing position to retain the same against retracting movement, spring means disposed to bias said sealing means toward sealing position, and valve means for releasing said sealing means for movement to sealing position.

13. Fluid testing mechanism in accordance with claim 8 in which said means for sequentially energizing the sealing means, valve means and tape moving means comprises, electrically energizable motors, electric circuits for energizing said motors, a relay controlling the energization of said motors, and means for alternately energizing and deenergizing said relay.

14. Fluid testing mechanism in accordance with claim 13 in which said means for energizing and deenergizing said relay includes, a volume control tank, conduit means for discharging filtrate from said filter outlet conduit into said tank, high and low level floats in said tank, float actuated high and low level switches operatively connected to said high and low level floats respectively and a circuit including the coil of said relay and said switches whereby the relay is energized upon the closing of the high level switch and deenergized upon the opening of said low level switch.

15. Fluid testing mechanism in accordance with claim 13 including means for interrupting the filtering operation in the event of the clogging of the filter tape comprising, an electric override timer, circuit means under control of said timer and including the coil of said relay for energizing the relay at the end of a predetermined maximum filter time.

16. Fluid testing means in accordance with claim 15 including an alarm circuit and means for energizing the alarm circuit in response to a signal from said override timer.

17. Fluid testing means in accordance with claim 14 including a drain valve for said volume control tank, electro-magnetic means for actuating said drain valve to open position and circuit means for energizing said electro-magnetic means under control of said relay.

18. Fluid testing apparatus comprising, a filter having a head and a body and a passage in said head and body for conducting fluid from one to the other thereof, means for positioning a porous filter sheet between said body and head and extending across said passage, an extensible and retractable flow chamber for filtrate disposed at the downstream side of said sheet, a resilient and compressible gasket surrounding said passage in the filter head for contact with said sheet at the upstream side thereof, said flow chamber having a perimetric edge member disposed opposite to said gasket to define and seal off a filtered residue area of said sheet while forming a projecting rim surrounding said area and means for extending said flow chamber to close and seal the filter body in relation to the filter head and to form said projecting rim.

19. Fluid testing mechanism comprising, a filter having a head, a body and a first passage in said head and body for conducting fluid from one to the other thereof; inlet and outlet ports for said passage; a supply of filter tape; means for guiding tape from said supply along a path extending between said head and body and across said passage; fluid inlet and outlet conduits connected to said inlet and outlet ports respectively; a by-pass conduit for the disposal of unfiltered fluid; a multiple port two-way valve having a valve inlet port adapted to be connected to a source of fluid to be tested, and first and second valve outlet ports connected respectively to said inlet conduit and by-pass conduit, said valve having a member which is selectively movable to a filter position connecting the valve inlet port to said first valve outlet port and to a by-pass position connecting said valve inlet port to said second valve outlet port, and power actuated means for imparting slow shifting movement of said valve member from one of said positions to the other.

20. Fluid testing mechanism in accordance with claim 19 in which said fluid is a liquid and including conduit means for discharging gases from said first passage and valve means interposed in said conduit means and operative in timed relation to the shifting of said valve member for discharging the gases from said conduit means.

21. Fluid testing means in accordance with claim 20 in which said two-position, multi-port valve has first and second vent ports, and said conduit means comprises a branch of said first passage connected to said first vent port and a gas outlet conduit connected to said second vent port, said valve member when in its by-pass position, establishing flow from said first vent port to said second vent port.

22. In fluid testing apparatus of the type in which a filter material has filtered residue deposited thereon, the improvement in means for guarding said filtered residue from spreading and smearing comprising means movable into contact with said filter material so as to deform a portion of said filter material into an annular rim surrounding an area upon which said filtered residue is deposited.

23. In fluid testing apparatus of the type in which a controlled amount of fluid is filtered through an intermittently movable piece of filter material during a period when said piece is stationary, the improvement in means for controlling movement of said piece comprising means for storing filtered fluid after said filtered fluid passes through said piece, and means responsive to a predetermined amount of fluid in said storing means for advancing said piece to another fluid filtering position after said predetermined amount of fluid is stored in said storing means.

References Cited in the file of this patent
UNITED STATES PATENTS

| | | |
|---|---|---|
| 2,177,060 | Drew | Oct. 24, 1939 |
| 2,197,909 | Wendler | Apr. 23, 1940 |
| 2,675,697 | Quynn et al. | Apr. 20, 1954 |
| 2,734,377 | Traver | Feb. 14, 1956 |

UNITED STATES PATENT OFFICE

CERTIFICATE OF CORRECTION

Patent No. 3,138,015 June 23, 1964

Hazelton H. Avery

It is hereby certified that error appears in the above numbered patent requiring correction and that the said Letters Patent should read as corrected below.

Column 3, line 24, for "tured" read -- turned --; column 6, line 45, for "190°" read -- 180° --.

Signed and sealed this 27th day of October 1964.

(SEAL)
Attest:

ERNEST W. SWIDER
Attesting Officer

EDWARD J. BRENNER
Commissioner of Patents